United States Patent
Chapman et al.

[11] Patent Number: 5,838,276
[45] Date of Patent: Nov. 17, 1998

[54] MICROWAVE ENERGY IMPLEMENTED AIRCRAFT LANDING SYSTEM

[76] Inventors: Aubrey I. Chapman, 6024 Longley Ct. Dr., Dallas, Tex. 75252; George F. Ridpath, 1908 Sherrye La., Plano, Tex. 75074

[21] Appl. No.: 709,466

[22] Filed: Sep. 3, 1996

Related U.S. Application Data

[63] Continuation-in-part of Ser. No. 366,831, Dec. 30, 1994, abandoned.

[51] Int. Cl.$^6$ .............................. G01S 1/38; G01S 13/75
[52] U.S. Cl. ............................................. 342/35; 342/33
[58] Field of Search .................... 342/6, 33, 35, 342/410, 412, 413

[56] References Cited

U.S. PATENT DOCUMENTS

| | | |
|---|---|---|
| 3,295,132 | 12/1966 | Chapman . |
| 3,680,089 | 7/1972 | Sanders . |
| 3,699,571 | 10/1972 | Sanders . |
| 3,713,149 | 1/1973 | Bruner et al. ............................. 342/88 |
| 3,798,646 | 3/1974 | Buehler et al. ......................... 342/413 |
| 4,677,442 | 6/1987 | Enein . |
| 4,698,636 | 10/1987 | Marlow et al. . |
| 4,723,123 | 2/1988 | Marlow et al. . |
| 4,806,932 | 2/1989 | Bechtel . |
| 5,045,859 | 9/1991 | Yetter . |
| 5,223,839 | 6/1993 | Grossman . |

*Primary Examiner*—Ian J. Lobo
*Attorney, Agent, or Firm*—David W. Quimby

[57] ABSTRACT

A microwave radio frequency landing system includes an aircraft borne transmitter/receiver (transceiver) and a ground unit. The ground unit comprises a dielectric material lens and a transponder module array. The transceiver transmits pulsed interrogation signals to the ground unit. The dielectric material lens focuses the pulsed signals onto the transponder module array. The transponder modules illuminated by the pulsed signals transmit continuous wave return signals to the aircraft. Each continuous wave return signal comprises four tones, which are used by the aircraft to determine azimuth and glide slope of the aircraft, carried on a microwave carrier. In each transponder module which receives the pulsed signals from the aircraft transceiver, the microwave carrier is phase inverted for the duration of each pulse of the pulsed signals. The phase inversions on the microwave carrier are used by the aircraft to determine the range, velocity and acceleration of the aircraft with respect to the ground unit.

9 Claims, 4 Drawing Sheets

5,838,276

MICROWAVE ENERGY IMPLEMENTED AIRCRAFT LANDING SYSTEM

This Application is a Continuation-In-Part (CIP) of the inventors earlier patent application entitled "Microwave Energy Implemented Aircraft Landing System", which has Ser. No. 08/366,831, and was filed Dec. 30, 1994, now abandoned.

BACKGROUND OF THE INVENTION (1) Field of the Invention

This invention relates generally to aircraft landing and takeoff systems, and more particularly, to aircraft landing and takeoff systems using microwave radio frequency (RF) energy to transmit audio frequency guidance tones from a ground unit to an aircraft so that the aircraft can determine azimuth, glide slope, range, velocity, and acceleration with respect to the ground unit.

(2) Description of Related Art

Landing and takeoff systems are used to guide aircraft to or from landing sites. Microwave landing and takeoff systems are desirable because such systems have highly directional and narrow signal beams. The beams minimize spurious reflections from buildings and terrain. Also, microwave systems are desirable because such systems can provide the aircraft with additional information such as wind shear information, ground speed, and range to runway.

Initial microwave systems employed a rotating modulating reflector (Luneberg lens). Such a system is described in U.S. Pat. No. 3,295,137 issued to Chapman. A problem with such systems is that the lens had to be mechanically spun.

Later systems used transponder modules located on the outside of the lens to avoid the necessity of spinning the lens. U.S. Pat. No. 4,723,123, issued to Marlow et al., and U.S. Pat. No. 4,806,932, issued to Bechtel, show microwave landing systems which receive pulsed signals from an aircraft. The received signals are focused by a dielectric material lens onto an array of reflectors or transmitter/receivers (transponders). In response to a pulsed signal from an aircraft, the array of reflectors or transponders returns the received pulsed signals back to the aircraft. The aircraft can determine range, velocity and acceleration from the returned signals. The reflector or transponder array may also transmit at least four separate pulse tones to the aircraft from at least four members of the array. The pulse tones indicate right and left, and above and below a desired flight path for the aircraft. The aircraft receives the pulses and determines the error from the desired flight path. The aircraft can then be manually or automatically controlled to conform to the desired flight path.

In prior art landing systems, the ground unit transmitted unique tone frequencies to designate individual locations within an azimuth/elevation matrix of beams. A band pass filter was required for each tone, both in the ground unit and in the airborne transceiver unit. This technique was well suited for installations using a limited number of tones. However, increasing the azimuth/elevation coverage of the system increased the number of tones and decreased the frequency spacing between the tones. Providing 360° azimuth and extended elevation coverage made both the ground unit and the airborne unit more complicated and expensive because of the necessity for more filters. It especially complicated the airborne unit because high Q, narrow band pass filters required by close tone spacing are not readily available in a small, compact, lightweight form suitable for airborne use.

Also, prior art microwave landing systems utilize pulsed signals transmitted from the ground unit to the aircraft. Utilization of pulsed signals from the ground unit requires RF spectrum bandwidth accommodation by the airborne receiver determined by the duration of the pulses. Short pulse duration requires greater bandwidth. The use of pulsed signals limits the range from which an aircraft can be guided to a landing site.

U.S. Pat. No. 5,045,859, issued to Yetter, discloses a phase referenced navigation system. The system can be used to provide azimuth information or glide slope information. The ground unit antenna array continuously broadcasts signals throughout the angular range of the system. The signals comprise a reference signal and variable phase signals, wherein the variable phase signals are frequency modulated onto one of two distinct frequency subcarriers. The variable phase signals radiated by adjacent antennas are conveyed on different subcarriers.

SUMMARY OF THE INVENTION (1) Progressive Contribution to the Art We have invented an aircraft landing system which utilizes phase shifted signals to determine aircraft azimuth and glide slope, and which utilizes phase inversion of a microwave carrier signal to determine range, velocity, and acceleration of the aircraft with respect to a ground unit. The system is comprised of an airborne transceiver which sends pulsed microwave signals to a ground unit. The ground unit comprises a dielectric material lens for focusing received and transmitted signals, and an array of transponders. The transponders of the transponder array are arranged in a pattern of rows and columns about the lens. Each row of the transponder array corresponds to a particular elevation, and each column of the transponder array corresponds to a particular azimuth direction. When a transponder module of the transponder array receives a signal from the airborne transmitter/receiver (transceiver), the transponder module transmits a continuous wave (CW) microwave carrier signal back to the airborne transceiver. The microwave carrier signal carries four significant tones.

The first tone is a reference azimuth tone having a frequency of perhaps 100 Hz. The tone indicates a particular azimuth direction as the zero degree azimuth reading.

The second tone is a reference glide slope tone having a frequency of perhaps 180 Hz. The tone indicates a zero degree glide slope.

The third tone is a phase-shifted azimuth tone. The tone is a phase shifted version of the reference azimuth tone. The amount of phase-shift applied to the tone depends on the position of the transponder module in the transponder module array which received the signal from the aircraft.

The fourth tone is a phase-shifted glide slope tone. The tone is a phase shifted version of the reference glide slope tone. The amount of phase shift applied to the tone depends on the position of the transponder module in the transponder module array which received the pulsed signal from the aircraft.

The first and second tones are frequency modulated onto a subcarrier having a frequency of perhaps 20 kHz, which is in turn amplitude modulated, at a constant amplitude, onto the microwave carrier. The third and fourth tones are also amplitude modulated, at a constant amplitude, onto the same microwave carrier.

Thus, a spectrogram of the continuous wave emission of the ground station would show a microwave carrier closely accompanied by three sets of double sidebands, corresponding respectively to: the third tone (100 Hz), the fourth tone (180 Hz) and the 20 kHz subcarrier that is frequency modulated by the first and second tones (100 Hz and 180 Hz, respectively).

The continuous wave signal from each transponder illuminated by a pulsed signal is transmitted to the aircraft's transceiver. If more than one transponder broadcasts a signal to the transceiver, the signals are added together to produce a resulting signal which is used to determine the azimuth, glide slope, range, velocity, and acceleration of the aircraft.

The transceiver compares the phase-shifted azimuth tone to the reference azimuth tone to determine the phase angle between the two tones. The phase angle indicates the azimuth of the aircraft with respect to the ground unit. The transceiver also compares the phase-shifted glide slope tone to the reference glide slope tone to determine the phase angle between the two tones. The phase angle indicates the glide slope of the aircraft.

The phase of the microwave carrier is inverted in a transponder module during each pulse of a received pulsed signal. The phase inversion of the microwave carrier allows the recovery of range information in terms of the time delay between when an interrogator pulse signal is transmitted to the ground unit and when the aircraft detects the return of the pulsed signals, and the velocity of the signals. The return signals are indicated by the phase inversions of the microwave carrier signal. The difference in time from when a pulse is sent to the ground unit and when a phase inversion on the microwave carrier corresponding to the pulse signal is received back by the airborne receiver/transmitter is determined by the aircraft and used to determine the range, velocity and acceleration of the aircraft with respect to the ground unit.

Such a landing system has several advantages over prior art navigation and landing systems. The ground unit is inactive until the ground unit receives pulsed signals from an aircraft. The ground unit lens uses an array of transponder modules, so rotation of the lens is not required. The transponder modules allow for coverage of a desired azimuth range and a desired glide slope range. Full 360° azimuth coverage is possible. Because the system can easily accommodate an extensive glide slope and azimuth range, the system is ideal for vertical takeoff or landing vehicles.

The use of a continuous wave signal from the ground unit allows for smaller receiver bandwidth and gives robust performance over a greater range than prior art systems. Prior art systems required a large number of frequencies, as well as bulky and expensive filters. The ground unit design and the airborne transceiver design are greatly simplified because the ground unit sends a continuous wave signal and because only a few frequencies are required to convey both azimuth and guide slope information by phase encoding.

(2) Objects of this Invention

An object of this invention is to improve microwave energy implemented aircraft landing and takeoff systems.

Another object is to convey aircraft azimuth and glide slope guidance information to an aircraft by transmitting phase-shifted, amplitude modulated tones on a ground unit transmitted continuous wave microwave carrier signal.

Another object is for an aircraft to calculate aircraft range, velocity, and acceleration with respect to a ground unit by processing a phase inverted signal of the pulsed signal sent to the ground unit, wherein said phase inverted signal is returned to the aircraft on a continuous wave microwave carrier signal.

Another object is for an airborne RF transceiver unit to receive a ground unit transmitted continuous wave RF signal and determine from the signal azimuth, glide slope, range, velocity, and acceleration of the aircraft with respect to the ground unit for use in automatic, semi-automatic, or manual guidance of the aircraft.

Further objects are to achieve the above with a device which is sturdy, compact, durable, light-weight, simple, safe, efficient, versatile, ecologically compatible, energy conserving and reliable; yet is inexpensive and easy to manufacture, install, maintain and use.

The specific nature of the invention, as well as other objects, uses, and advantages thereof, will clearly appear from the following description and from the accompanying drawings, the different views of which are not necessarily scale drawings.

Figure 1A:
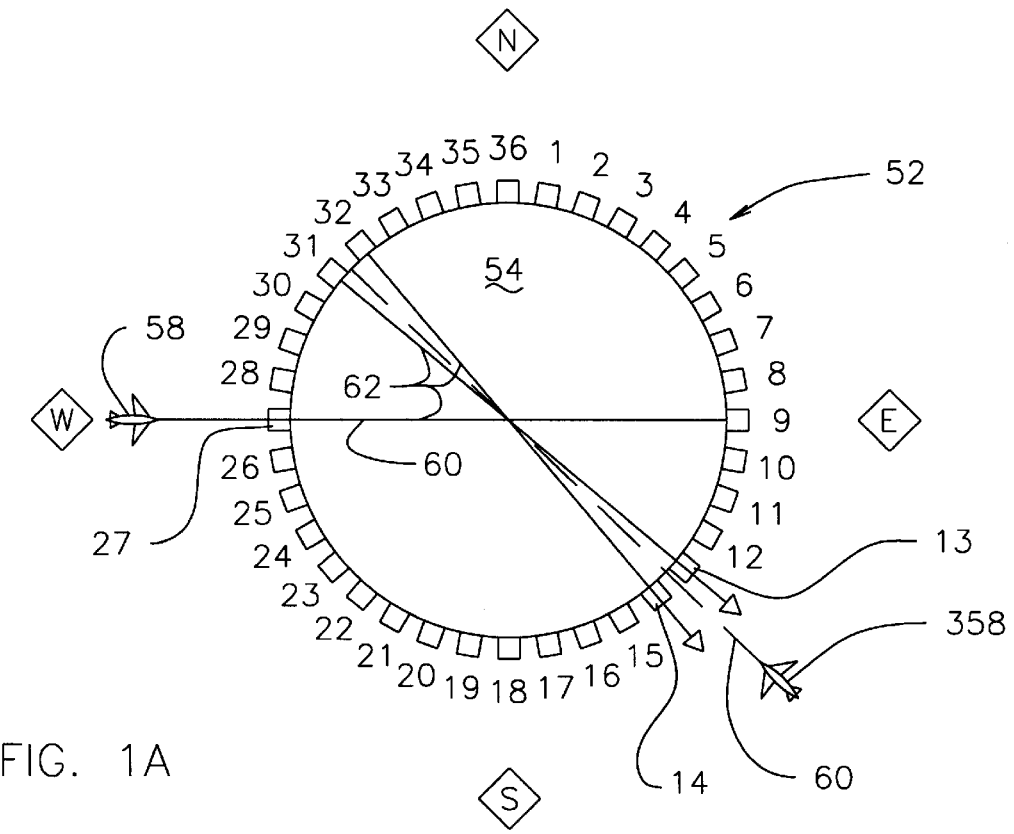
FIG. 1A shows a top elevational view of a spherical lens having a transponder array with 10° beam spacing and 360° azimuth coverage.

As an aid to correlating the terms of the claims to the exemplary drawings the following catalogue of elements is provided:

| | |
|---|---|
| 50 | ground unit |
| 52 | transponder module array |
| 54 | lens |
| 56 | transceiver |
| 58 | aircraft |
| 60 | pulsed signal |
| 62 | continuous wave signal |
| 64 | transponder component block |
| 66 | system component block |
| 68 | antenna |
| 70 | coupler |
| 72 | coupler |
| 74 | band pass filter (BPF) |
| 76 | circulator |
| 78 | BPF |
| 80 | signal level limiter |
| 82 | mixer |
| 84 | local oscillator (LO) |
| 86 | BPF |
| 88 | limiter/amplifier |
| 90 | amplitude detector |
| 92 | modulation control |
| 94 | switch |
| 96 | phase inverter |
| 98 | amplifier |
| 100 | amplitude modulator |
| 102 | azimuth tone generator |
| 104 | azimuth phase modulator |
| 106 | glide slope tone generator |
| 108 | glide slope phase modulator |
| 110 | frequency modulator |
| 112 | local oscillator |
| 114 | built in test circuit |
| 116 | automatic level control |
| 200 | transceiver antenna |
| 202 | BPF |
| 204 | circulator |
| 206 | limiter |
| 208 | BPF |

-continued

| | |
|---|---|
| 210 | mixer |
| 212 | LO |
| 214 | BPF |
| 216 | limiter/amplifier |
| 218 | phase-locked loop |
| 220 | tracker |
| 222 | pulse repetition frequency control |
| 224 | BPF |
| 226 | limiter/amplifier |
| 228 | decoder |
| 230 | amplitude detector |
| 232 | 20 kHz filter |
| 234 | frequency discriminator |
| 236 | azimuth phase detector |
| 238 | glide slope phase detector |
| 240 | 100 Hz filter |
| 242 | 180 Hz filter |
| 244 | gate switch/amplifier |
| 358 | aircraft |

DESCRIPTION OF THE PREFERRED EMBODIMENTS

With reference to the drawings, a ground unit is indicated by reference numeral 50. The ground unit comprises an array of transponder modules 52 located approximately at the focal point of dielectric material lens 54.

The dielectric material lens 54 is preferably a spherical Luneberg lens. The focal point of such a lens is a sphere located approximately at the surface of the lens. Other dielectric material lens geometries and types can be used as long as the lens focuses incoming signals onto the transponder module array 52 throughout the desired azimuth and elevation ranges.

The array 52 comprises rows and columns of transponder modules. To have 360° azimuth coverage, the rows of the array 52 should encircle the lens 54. FIG. 1A shows a lens 54 which provides 360° azimuth coverage. As shown in FIG. 1A, the individual members of a row of transponder modules are positioned every 10° around the lens 54. The azimuth position of a transponder module is indicated by reference numerals 1 through 36, with numeral 1 indicating a 10° azimuth position and each subsequent numeral indicating a 10° change in azimuth. Numeral 35 indicates a transponder module having a 350° azimuth position, and numeral 36 indicates a transponder module having a 0° azimuth position.

Figure 1B:
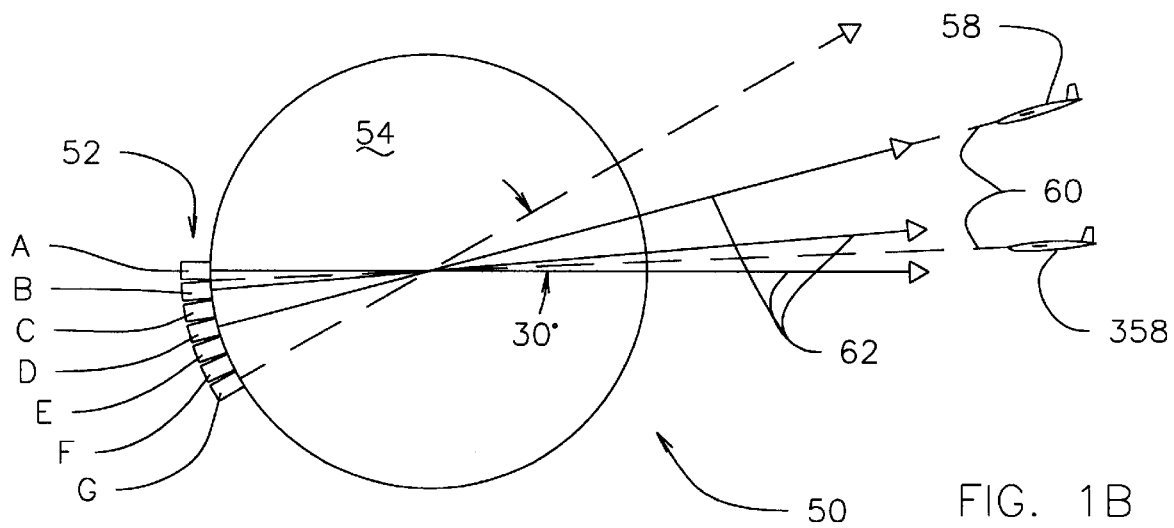
FIG. 1B shows a side elevational view of a spherical lens with a single column of transponders represented, said column of transponders having a 5° beam spacing and 30° of elevation coverage.

The elevational range of the ground unit 50 is determined by the number of transponder modules in a column. As shown in FIG. 1B, the individual members of a column of transponder modules are positioned every 5° on a vertical section of the lens 54, providing an elevational coverage range from 0 to 30 degrees. Only one column of transponder modules is shown in FIG. 1B for clarity, but there is a column of transponder modules for every row of transponder modules. The elevational position of a transponder module is indicated by reference letters A through G, with letter A corresponding to 0° of elevation, and each subsequent letter indicating a 5° change in elevation.

The transponder modules of the transponder module array are positioned so that continuous microwave signal beams broadcast from adjacent transponder modules cross over at the equal power points of the beams.

Transceiver 56 of aircraft 58 transmits pulsed microwave signals 60 to the ground unit 50. The lens 54 focuses the signals onto one or more transponder modules of the transponder module array 52. The transponder module or transponder modules that receive the pulsed signals 60 from the aircraft's transceiver 56 transmit continuous wave (CW) microwave carrier signal 62 back to the aircraft's transceiver 56. The CW signal 62 is a complex waveform which carries a phase-shifted, amplitude modulated azimuth tone; a phase-shifted, amplitude modulated glide slope tone; a reference azimuth tone; and a reference glide slope tone on a microwave carrier. The microwave carrier is phase inverted for the duration of each pulse of the pulsed signals 60 that were transmitted to the ground unit lens 54. The transceiver 56 of the aircraft 58 processes the returned complex CW signal 62 and determines the azimuth, glide slope, range, velocity, and acceleration of the aircraft with respect to the ground unit 50.

The phase-shifted, amplitude modulated azimuth tone; phase-shifted, amplitude modulated glide slope tone; reference azimuth tone; and reference glide slope tone can be carried on three frequencies. For example: 100 Hz for an azimuth frequency, 180 Hz for a glide slope frequency, and 20 kHz for a reference subcarrier frequency. The azimuth frequency carries the phase-shifted, amplitude modulated azimuth tone. The glide slope frequency carries the phase-shifted, amplitude modulated glide slope tone. The reference subcarrier frequency carries the two reference tones. The first reference tone is a 0° azimuth reference tone, and the second reference tone is a 0° glide slope reference tone.

Figure 2:
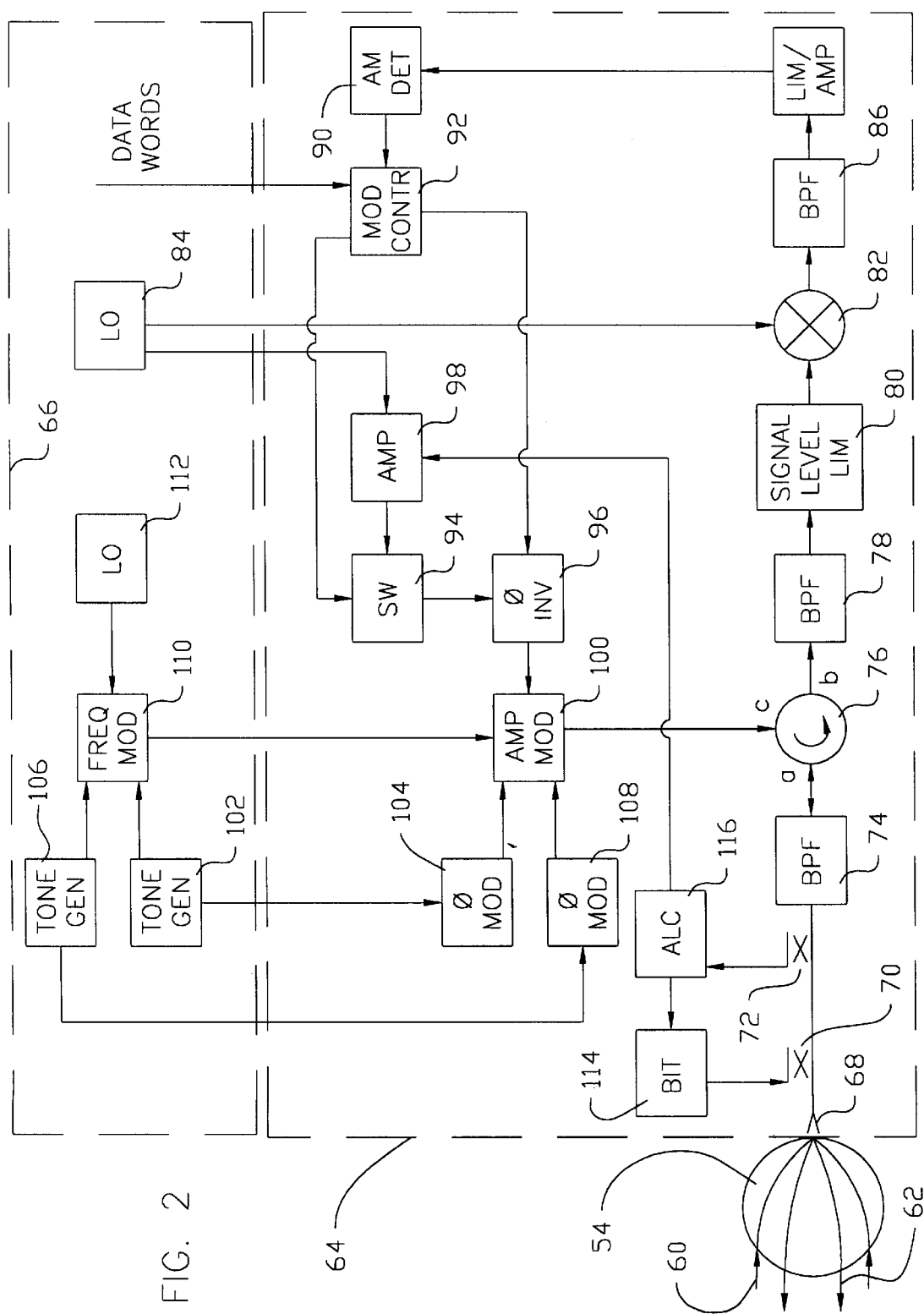
FIG. 2 is a block diagram of a ground unit transponder module.

FIG. 2 shows a block diagram of a transponder module. There may be from three to over a hundred transponder modules mounted on lens 54, depending on desired azimuth and elevation coverage. Block 64 indicates components which are present in each transponder module. Block 66 indicates components that are used by each transponder module, but are not individually present in each transponder module. For example, each transponder module uses local oscillator (LO) 84, but there is only one local oscillator (LO) 84, not one per module. Each module is fed a signal from the LO 84 so that the carrier signal emission from all the modules will be of a single frequency and co-phasal.

A transponder module receives a pulsed 9200 MHz interrogation signal 60 from an airborne transceiver 56. The transponder module returns an 8900 MHz continuous wave signal 62 back to the transceiver 56. The pulsed signal 60 is received by the ground unit lens 54 and is focused on transponder module antenna 68. The signal is routed to coupler 70 and to coupler 72. The signal passes through the couplers 70, 72 to band pass filter (BPF) 74 and then to port (a) of circulator 76. The signal is directed out of port (b) of the circulator 76 to BPF 78. The signal is routed through signal level limiter 80 to mixer 82. The mixer 82 mixes the 9200 MHz pulsed signal with a 8900 MHz signal from local oscillator (LO) 84 to produce a 300 MHz intermediate frequency (IF) signal. From mixer 82, the IF signal passes through BPF 86 to remove the unwanted mixer frequency products before being sent to limiter/amplifier 88. From the limiter/amplifier 88 the signal passes to amplitude detector 90 and then the IF signal passes to modulation control 92.

The modulation control 92 provides control information to switch 94 and provides carrier phase inversion information to phase inverter 96 Also, data words can be added to an output signal stream of the modulation control 92. Such data words could include information such as an identification code of the particular ground facility, meteorological data, or pitch, roll and heave information of a vessel on which the ground unit 50 is mounted. The data words can also include set point azimuth and glide slope information which indicates a desired approach path to the landing site. Such information can be used for automatic, semi-automatic, or manual guidance of the aircraft. The data words are derived by outside means and added to the phase inversion signal in the modulation control 92.

Switch 94 is an on/off switch. When the modulation control 92 receives approximately 10 pulses from the transceiver 56, the modulation control 92 sends a signal to the switch 94 which opens the switch 94 and allows the 8900 MHz signal from the LO 84 and amplifier 98 to pass through the switch 94. This results in a continuous wave signal 62 being broadcast to the aircraft's transceiver 56. After a time period of approximately 10 pulses of not receiving any pulses, the modulation control 92 sends a signal to the switch 94 which closes the switch 94 and stops the broadcasting of the continuous wave signal 62 from the transponder module.

The microwave carrier passes to phase inverter 96 from switch 94. The phase inverter also receives control signals from modulation control 92 which governs when the phase of the microwave carrier signal is inverted. The phase of the microwave carrier is phase inverted for the duration of time of each pulse of the pulsed signal 60 received by the transponder module. From the phase inverter 96, the microwave carrier signal passes to amplitude modulator 100.

The phase shifted azimuth tone is generated by azimuth reference tone generator 102, and the tone passes to phase modulator 104. The phase modulator 104 provides the proper phase shift to the azimuth reference tone for the particular transponder module. The phase shifted glide slope tone is generated by glide slope reference tone generator 106, and the tone passes to phase modulator 108. The phase modulator 108 provides the proper phase shift to the glide slope reference tone for the particular transponder module.

The azimuth reference tone from tone generator 102 and the glide slope reference tone from tone generator 106 are also passed to frequency modulator 110. Frequency modulator 110 receives the reference subcarrier from LO 112. The reference tones are frequency modulated onto the subcarrier in frequency modulator 110.

The amplitude modulator 100 receives a phase-shifted azimuth tone on the azimuth frequency (100 Hz), a phase-shifted glide slope tone on the glide slope frequency (180 Hz), and reference azimuth and glide slope tones on the reference subcarrier frequency (20 kHz). The amplitude modulator 100 amplitude modulates these frequencies onto the microwave subcarrier received from the phase inverter 96. The phase shift of the azimuth tone and the phase shift of the glide slope tone depend on the position of the transponder module in the transponder module array 52. For example, transponder module 19C supplies an azimuth tone that has a phase shift of 190° with respect to the reference azimuth tone, and a glide slope tone that has a phase shift of 10° with respect to the reference glide slope tone; while transponder module 36A supplies an azimuth tone that has a phase shift of 0° with respect to the reference azimuth tone and a glide slope tone that has a phase shift of 0° with respect to the reference glide slope tone. As a further example, if transponder module 5G was illuminated with a pulsed signal from an aircraft, transponder module 5G would transmit a continuous wave signal 62 carrying a reference subcarrier with a reference azimuth tone and a reference glide slope tone, an azimuth tone that has a phase shift of 50° with respect to the reference azimuth tone, and a glide slope tone that has phase shift of 30° with respect to the reference glide slope tone.

The signal output from the amplitude modulator 100 passes through port (c) of circulator 76, which directs the signal through port (a) to the BPF 74 and then to antenna 68. The antenna 68 broadcasts the signal through the lens 54 to the aircraft's transceiver 56.

The transponder module also includes built-in-test (BIT) 114 and automatic level control (ALC) 116. A test pulse signal is introduced at the coupler 70 from BIT 114. This signal is passed to BPF 74 and treated as if it were a received pulsed signal from an aircraft. The coupler 72 passes a portion of a signal being output to the ALC 116. A performance monitor in the BIT 114 receives the output signal from ALC 116, and any discrepancies between the content of the input test pulse and the output test pulse signal will trigger an alarm. Also, the sampled output power level is compared to a set reference level and used to control the gain of amplifier 98, thereby maintaining a relatively stable transmitted output power level.

Figure 3:
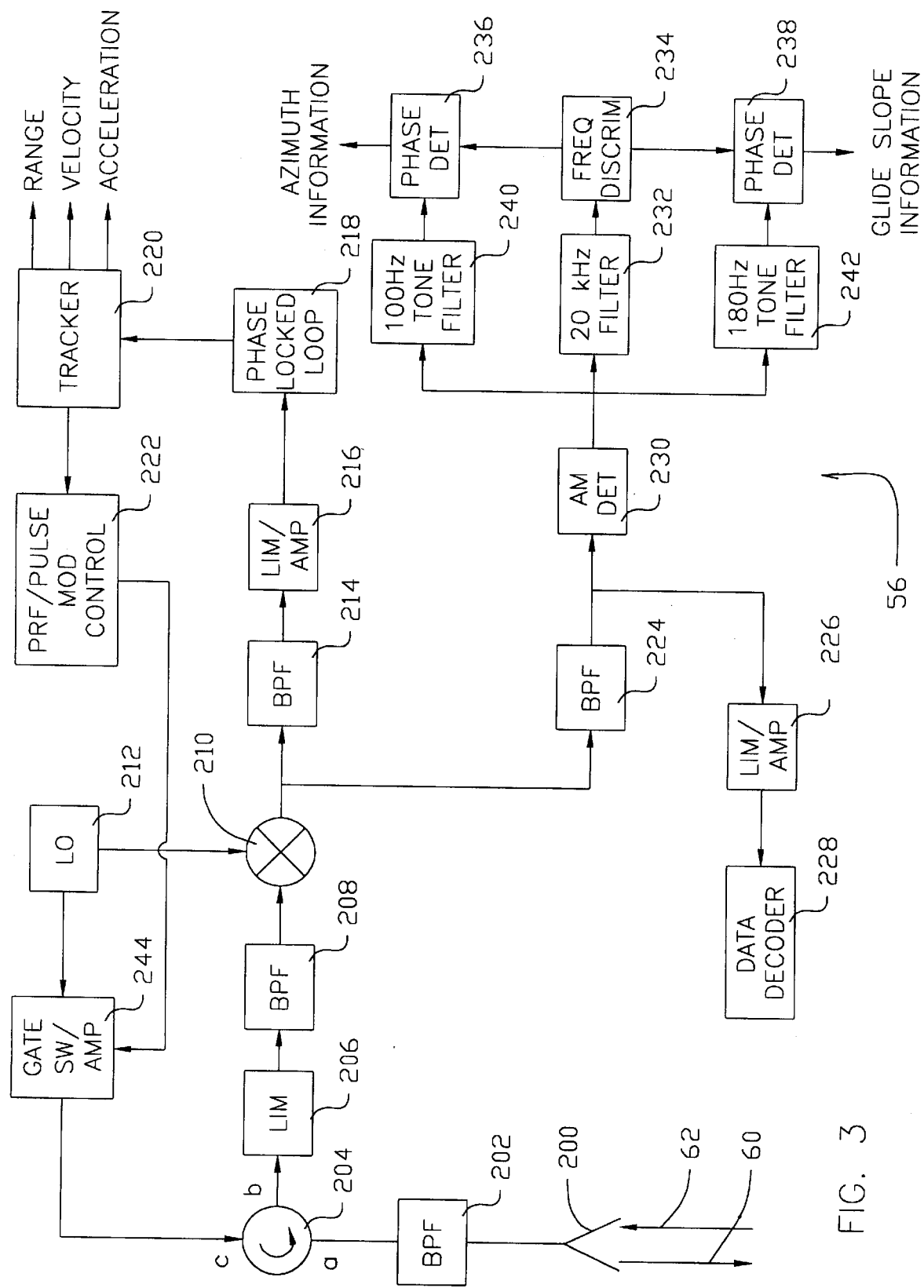
FIG. 3 is a block diagram of an airborne transceiver unit.

FIG. 3 shows a block diagram of an airborne transceiver 56. The transceiver 56 transmits a 9200 MHz pulsed interrogation signal 60 to the ground unit 50 and receives the ground unit's 8900 MHz CW signal 62. The 8900 MHz CW signal 62 is received by antenna 200 which may be a fixed, non-scanning reflector; a horn; a flat-plate; or a stub design antenna. The signal is then routed through band pass filter 202 to port (a) of circulator 204. The circulator 204 routes the signal to limiter 206 from port (b) of the circulator 204. From the limiter 206 the signal passes through BPF 208 to mixer 210. The mixer 210 is also fed with a 9200 MHz signal from LO 212 to provide a 300 MHz IF signal.

From the mixer 210, the signal is routed to two different paths. The first path is through BPF 214 to limiter/amplifier 216 and then to phase-locked loop 218, which acts as a detector of phase carrier inversion. The phase-locked loop 218 oscillates as a locked "flywheel" at the 300 MHz IF frequency and possesses too much "inertia" (small loop bandwidth) to be affected by the brief pulses of inverted phase. A phase detector contained in the phase locked loop 218 compares this oscillator signal with the actual received IF carrier signal and normally outputs a negative voltage. When the IF carrier signal phase inverts, the output becomes a positive voltage, indicating a recovered pulse.

From the phase-locked loop 218, the recovered pulse signal passes to tracker 220. The tracker 220 determines the range of the aircraft from the ground unit 50 from the time delay between the output of a pulse from pulse repetition frequency (PRF) control 222, and the arrival of the return phase inverted signal from the ground unit 50 at tracker 220. The tracker 220 also contains differentiator circuitry to determine the velocity and acceleration of the aircraft 58 with respect to the ground unit 50.

The second path of the IF signal from mixer 210 is to BPF 224. From BPF 224 the signal is routed to two different paths. The first path is to limiter/amplifier 226 and to decoder 228. The decoder 228 recovers the data words added to the continuous wave signal 62 in a transponder module.

The second path from BPF 224 is to amplitude detector 230. After the amplitude detector 230, the signal is split into three paths. The first path is to a 20 kHz filter 232 and to frequency discriminator 234 which recovers the azimuth and glide slope reference tones. The azimuth zero degree reference tone is sent to azimuth phase detector 236, and the glide slope zero degree reference tone is sent to glide slope phase detector 238.

The second path from amplitude detector 230 is to 100 Hz filter 240 and then to the azimuth phase detector 236. The azimuth phase detector 236 outputs the phase angle between the tone carried on the azimuth frequency and the azimuth reference tone carried on the reference subcarrier frequency. The azimuth of the aircraft can be manually or automatically controlled based upon the output signal from azimuth phase detector 236.

The third path from amplitude detector 230 is to 180 Hz filter 242 and then to the glide slope phase detector 238. The glide slope phase detector outputs the phase angle between the tone carried on the glide slope frequency and the glide slope reference tone carried on the reference subcarrier frequency. The glide slope of the aircraft can be manually or automatically controlled based upon the output signal from glide slope phase detector 238.

The 9200 MHz pulsed signal 60 sent to the ground unit 50 is generated by the PRF control 222, the 9200 MHz LO 212 and gate switch/amplifier 244. The pulsed signal from gate switch/amplifier 244 is routed to port (c) of circulator 204 and then to the BPF 202 from port (a) of the circulator 204. From BPF 202, the 9200 MHz pulsed signal is routed to antenna 200, which directs the pulsed signal 60 to the ground unit 50.

Specific examples follow: Transponder module 9D of FIGS. 1A and 1B receives a pulsed signal 60 from aircraft 58, the transponder module 9D transmits a complex continuous wave signal 62 to the aircraft 58 comprised of a phase-shifted azimuth tone on the 100 Hz azimuth frequency; a phase-shifted glide slope tone on the 180 Hz elevation frequency; and a reference azimuth and glide slope tone on the 20 kHz reference subcarrier frequency. All three of these frequencies are carried by amplitude modulation on a CW microwave carrier signal 62. The CW microwave carrier 62 is phase inverted for the duration of each pulse received by the transponder module 9D.

Module 9D is located on the east side of the Luneberg lens 54. The module 9D transmits an azimuth tone having a phase of 90° with respect to the reference azimuth tone. The transmitted signal from transponder module 9D is directed predominately to the west (azimuth 270°).

When the aircraft's transceiver 56 receives the CW signal 62 transmitted from transponder module 9D, the CW signal 62 is processed. The azimuth phase detector 236 determines the phase angle of the phase-shifted, amplitude modulated azimuth tone with respect to the azimuth reference tone to be 90°, indicating a flight vector of due east (90°) as shown in FIG. 1A. The glide slope phase detector 238 determines the phase angle of the glide slope phase-shifted tone with respect to the glide slope reference tone to be 15°, indicating a glide slope of 15°. A signal containing the phase inversions of the pulses sent from the transceiver 56 to the ground unit 50 is directed to phase locked loop 218, and the resulting signals are sent to tracker 220. The tracker 220 determines the time difference between when a pulsed signal 60 was sent to the ground unit 50 and when a phase inverted signal of the pulsed signal 60 is returned to the aircraft 58. The time differene is used by the tracker 220 to calculate range, velocity and acceleration of the aircraft 58 with respect to the ground unit 50.

Figure 4:
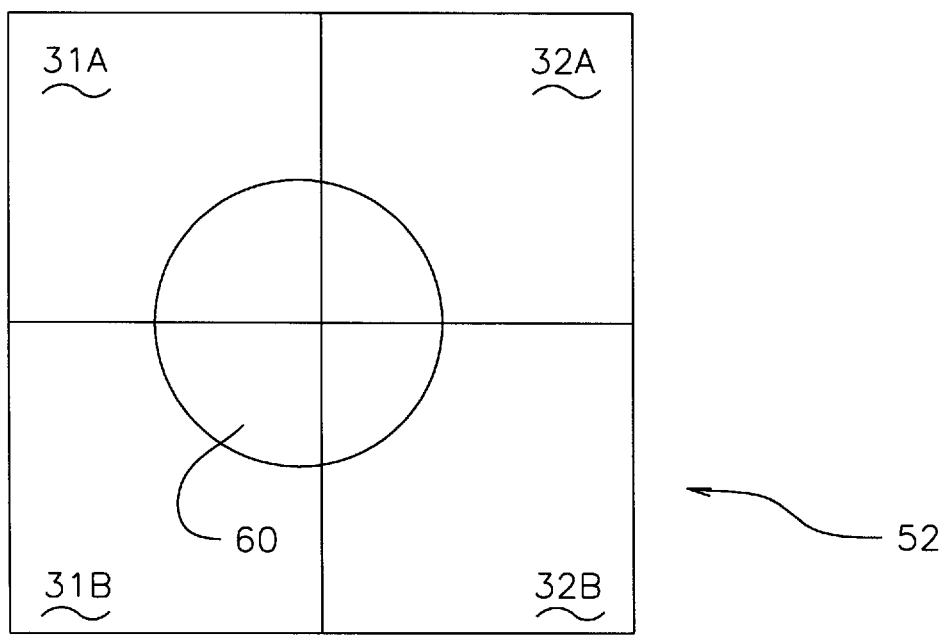
FIG. 4 is a diagram of four transponder modules receiving a pulsed signal from an airborne transceiver.

FIG. 4 shows four transponder modules 31A, 31B, 32A, 32B being illuminated by pulsed signals 60 from an aircraft 358. Transponder modules 31A and 31B each receive 30% of each pulsed signal, and transponder modules 32A and 32B each receive 20% of each pulsed signal 60. Each transponder module 31A, 31B 32A, 32B sends a continuous wave signal 62 to the airborne transceiver 56. Each continuous wave signal 62 sent to the transceiver 56 carries a phase shifted azimuth tone, a phase shifted glide slope tone, and a reference subcarrier frequency which carries a reference azimuth tone and a reference glide slope tone. Each microwave carrier is phase inverted for the duration of each pulse received by the transponder modules 31A, 31B, 32A, 32B.

The airborne transceiver 56 receives the continuous wave signals 62 broadcast from each transponder module 31A, 31B, 32A, 32B. The passage of the continuous wave signals through the lens 54 and the reception of the signals by the airborne antenna 200 combines the signals into a resulting signal. Since the microwave carriers are co-phasal by system design (one local oscillator 84), the sidebands will combine vectorially. The combined 31A and 31B 100 Hz signals are stronger at the aircraft receiver than the combined 32A and 32B 100 Hz signals. Therefore, the azimuth phase will be closer to 310° than 320°. But, the combined 31A and 32A 180 Hz signals are the same strength as the combined 31B and 32B 180 Hz signals, so the elevation phase is midway between 0° and 5°. In this case, the azimuth phase detector 236 will determine the azimuth phase angle between the azimuth tone and the reference azimuth tone of the resulting signal to be 314°, and the glide slope phase detector 238 will determine the glide slope phase angle between the glide slope tone and the reference glide slope tone of the resulting signal to be 2.5°. This indicates a flight azimuth of 314° and a flight glide slope of 2.5°, as indicated by aircraft 358 in FIGS. 1A and 1B.

The embodiments shown and described above are only exemplary. We do not claim to have invented all the parts, elements, or steps described. Various modifications can be made in the construction, material, arrangement, and operation, and still be within the scope of our invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A method of providing guidance information to an aircraft comprising the steps of:

illuminating a dielectric material lens with pulsed signals from an aircraft;

said lens focusing received pulsed signals from the aircraft onto a transponder module or transponder modules of a transponder module array which is in working relation to said dielectric material lens;

broadcasting continuous wave microwave carrier signals to the aircraft from each transponder module which received pulsed signals from said aircraft, said continuous wave microwave carrier signals carry an azimuth reference tone, a glide slope reference tone, a phase shifted azimuth tone, and a phase shifted glide slope tone;

combining received signals sent from the transponder module array to form a resultant phase shifted azimuth tone and a resultant phase shifted glide slope tone;

determining azimuthal position of the aircraft by determining phase between the resultant phase shifted azimuth tone and the azimuth reference tone in the aircraft; and determining glide slope of the aircraft by determining phase between the resultant phase shifted glide slope tone and the glide slope reference tone in the aircraft.

2. The method of providing guidance information to an aircraft as defined in claim 1 further comprising the step of:

phase inverting a continuous wave microwave carrier signal for the duration of each pulse of the pulsed signals received from the aircraft before broadcasting the continuous wave microwave carrier signal to the aircraft.

3. A microwave radio frequency landing and takeoff system comprising:

a dielectric material lens for focusing received and transmitted radio frequency signals;

a transponder module array comprised of transponder modules in working relation to said lens; and an airborne transceiver aboard an aircraft which transmits pulsed radio frequency signals to said lens; wherein each transponder module which receives pulsed signals from said transceiver of said aircraft transmits a continuous wave microwave signal back to said transceiver, each of said continuous wave microwave signal carries an azimuth reference tone, a glide slope reference tone, a phase shifted azimuth tone, and a phase shifted glide slope tone, and said tones are used aboard the aircraft to determine glide slope and azimuthal position of the aircraft.

4. The microwave radio frequency landing and takeoff system as defined in claim 3 wherein said continuous wave microwave signal comprises a microwave signal which is phase inverted for the duration of each pulse of the pulsed signals received from said transceiver.

5. The microwave radio frequency landing and takeoff system as defined in claim 3 wherein said dielectric material lens is a Luneberg lens.

6. The microwave radio frequency landing and takeoff system as defined in claim 3 further comprising built in test means in each transponder module for testing reliability of each transponder module.

7. A microwave radio frequency landing and takeoff system comprising:

a dielectric material lens for focusing received and transmitted radio frequency signals;

a transponder module array comprised of transponder modules in working relation to said lens; and an airborne transceiver aboard an aircraft which transmits pulsed radio frequency signals to said lens; wherein said lens focuses the pulsed radio frequency signals from the airborne transceiver onto a transponder module or transponder modules of the transponder module array;

each transponder module which receives said pulsed radio frequency signals from the airborne transceiver transmits a continuous wave microwave signal through said lens back to the airborne transceiver;

said continuous wave microwave signal is phase inverted for the duration of each pulse of the received pulsed signals from the airborne transceiver and said airborne transceiver determines range of the aircraft to said dielectric material lens based upon velocity of signals between the dielectric material lens and aircraft and based upon time difference between when a pulse is transmitted to the dielectric material lens and when a phase inversion of the continuous microwave signal received by the transceiver indicates the return of the pulse.

8. The microwave radio frequency landing and takeoff system as defined in claim 7 wherein said dielectric material lens is a Luneberg lens.

9. The microwave radio frequency landing and takeoff system as defined in claim 7 further comprising built in test means in each transponder module for testing reliability of each transponder module.

* * * * *